UNITED STATES PATENT OFFICE.

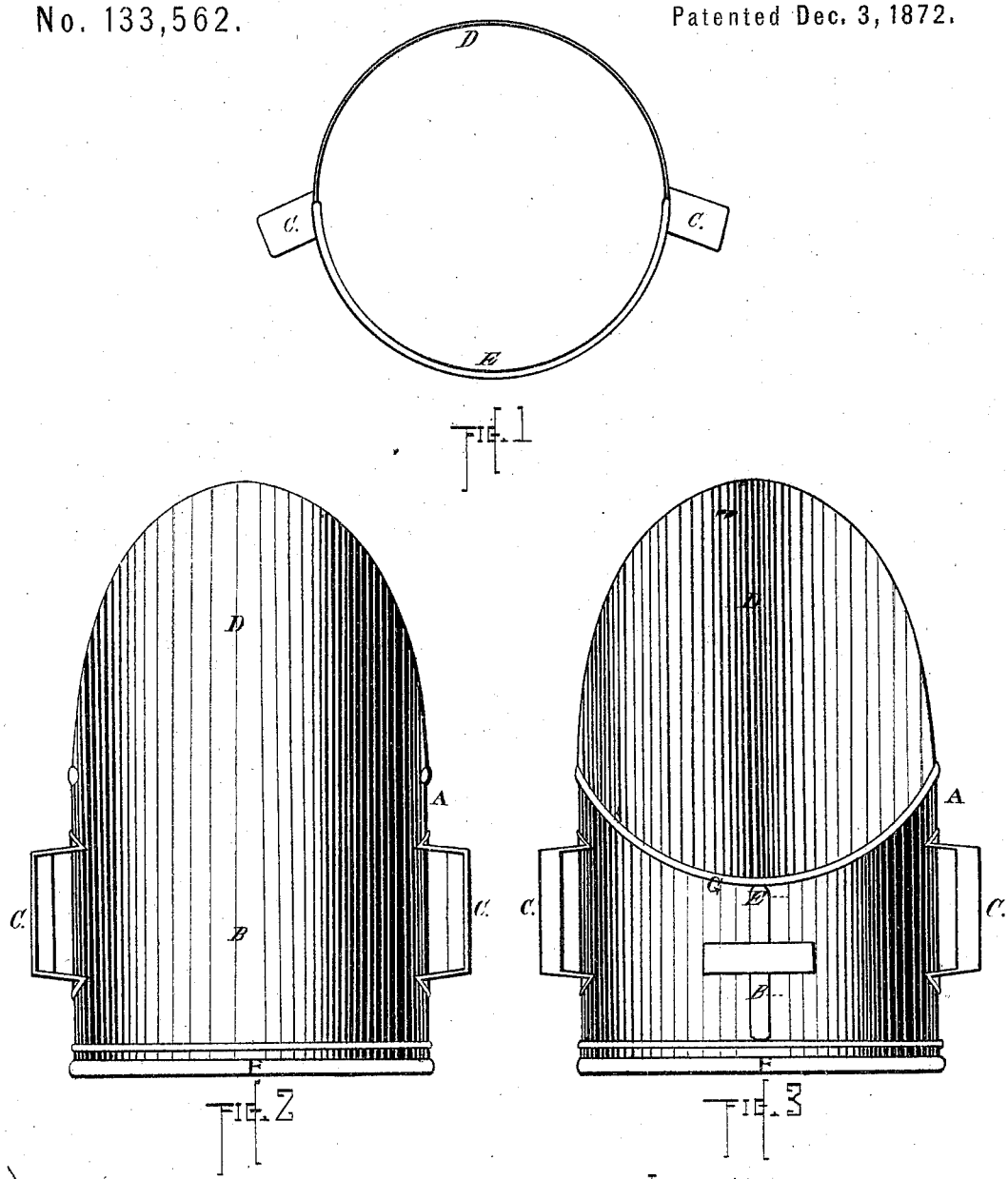

GEORGE B. CHAFFIN, OF HOLDEN, MASSACHUSETTS.

IMPROVEMENT IN GRAIN-BAGGING SCOOPS.

Specification forming part of Letters Patent No. 133,562, dated December 3, 1872.

*To all whom it may concern:*

Be it known that I, GEORGE B. CHAFFIN, of Holden, in the county of Worcester and Commonwealth of Massachusetts, have invented certain new and useful Improvements in Grain-Bagging Scoops; and I do hereby declare the following to be a clear, full, and exact description of the same, reference being had to the accompanying drawing, in which—

Figure 1 represents a front view of my improved scoop; Fig. 2 represents an under-side view; and Fig. 3 represents a top or plan view.

To enable those skilled in the art to which my invention belongs to make and use the same, I will proceed to describe it in detail.

In the drawing, the scoop A is made with a circular or base part, B, having a handle, C, on each side. The front lower part of the base B is extended to form the scoop part D, while the upper part is made in curved form, as shown at E. The scoop may be made of heavy tin or other sheet metal; and the edges F and G may be strengthened with a binding wire.

The operation is as follows: The operator takes the bag and slips the mouth of the bag over the base or lower part B, and then takes hold of the handles C, thereby clasping the bag to the base of the scoop, when he forces the scoop part D into the grain, and then, by a slight upward motion of the device, throws the gathered grain into the bag, and the operation is repeated until the bag is full.

The operation of filling a bag is easy and quick, while with the old device, which consisted of a single hoop, it requires much time to wind the mouth of the bag about the hoop, and then it required much effort to keep the mouth of the bag in place, while the operation of filling the bag was comparatively slow and fatiguing.

The bagging of grain is now an extensive business, owing to its shipment from place to place by the car-load and otherwise.

My improved grain-bagging scoop may be used with good effect in bagging all kinds of seeds, and other articles and substances to which it may be adapted.

Having described my improvements in scoops, what I claim as of my invention, and desire to secure by Letters Patent, is—

A grain-bagging scoop having a base, B, scoop part D, and scoop-and-bag-supporting handles C C, as herein shown and described.

GEO. B. CHAFFIN.

Witnesses:
E. E. MOORE,
J. A. KINSMAN.